US012328545B2

(12) United States Patent
Zepp

(10) Patent No.: US 12,328,545 B2
(45) **Date of Patent: *Jun. 10, 2025**

(54) HYBRID RING-RADIATOR HEADPHONE DRIVER

(71) Applicant: Voyetra Turtle Beach, Inc., White Plains, NY (US)

(72) Inventor: David Zepp, Poway, CA (US)

(73) Assignee: Voyetra Turtle Beach, Inc., White Plains, NY (US)

( * ) Notice: Subject to any disclaimer, the term of this patent is extended or adjusted under 35 U.S.C. 154(b) by 48 days.

This patent is subject to a terminal disclaimer.

(21) Appl. No.: 18/235,902

(22) Filed: Aug. 21, 2023

(65) Prior Publication Data

US 2023/0396916 A1 Dec. 7, 2023

Related U.S. Application Data

(63) Continuation of application No. 17/215,330, filed on Mar. 29, 2021, now Pat. No. 11,750,964, which is a continuation of application No. 16/787,085, filed on Feb. 11, 2020, now Pat. No. 11,006,204, which is a continuation of application No. 16/546,899, filed on Aug. 21, 2019, now Pat. No. 10,798,478, which is a continuation of application No. 15/627,803, filed on Jun. 20, 2017, now Pat. No. 10,455,317, which is a continuation of application No. 14/722,797, filed on May 27, 2015, now Pat. No. 9,686,604.

(60) Provisional application No. 62/003,306, filed on May 27, 2014.

(51) Int. Cl.

*H04R 1/10* (2006.01)
*H04R 1/24* (2006.01)
*H04R 3/12* (2006.01)
*H04R 9/02* (2006.01)
*H04R 9/04* (2006.01)

(52) U.S. Cl.

CPC ............. *H04R 1/1075* (2013.01); *H04R 1/24* (2013.01); *H04R 3/12* (2013.01); *H04R 9/025* (2013.01); *H04R 9/04* (2013.01)

(58) Field of Classification Search

CPC .......... H04R 1/1075; H04R 1/24; H04R 3/12; H04R 9/025; H04R 9/04; H04R 1/025; H04R 1/1041; H04R 1/1058; H04R 2201/109; H04R 2205/022; H04R 2460/01; H04R 3/00; H04R 5/033; H04S 3/004; G10K 11/1784

USPC .......... 381/370, 380, 74, 374, 371, 23.1, 17, 381/309, 190, 312, 18, 191, 300, 1, 150, 381/152, 307, 345, 346, 377, 396, 400; 455/575.2

See application file for complete search history.

(56) References Cited

U.S. PATENT DOCUMENTS 4,005,278 A 1/1977 Gorike
4,418,248 A 11/1983 Mathis
5,258,584 A 11/1993 Hubbard (Continued)

OTHER PUBLICATIONS

Int'l Preliminary Examination Report dated Apr. 3, 2003 corresponding to International application No. PCT/DK02/00009.

*Primary Examiner* — Norman Yu

(74) *Attorney, Agent, or Firm* — McAndrews, Held & Malloy, Ltd.

(57) ABSTRACT

A system and method for a hybrid ring-radiator headphone driver, substantially as shown in and/or described in connection with at least one of the figures, as set forth more completely in the claims.

20 Claims, 7 Drawing Sheets

(56) References Cited

U.S. PATENT DOCUMENTS

| | | | | |
|---|---|---|---|---|
| 5,339,286 | A | 8/1994 | Esposto | |
| 6,980,664 | B2 * | 12/2005 | Goller | H04R 9/063 381/186 |
| 9,686,604 | B2 | 6/2017 | Zepp | |
| 10,455,317 | B2 | 10/2019 | Zepp | |
| 10,798,478 | B2 | 10/2020 | Zepp | |
| 11,006,204 | B2 | 5/2021 | Zepp | |
| 2010/0046783 | A1 * | 2/2010 | Huang | H04R 1/1075 381/380 |
| 2015/0139479 | A1 | 5/2015 | Lai | |
| 2015/0350765 | A1 | 12/2015 | Zepp | |

* cited by examiner

300

HYBRID RING-RADIATOR HEADPHONE DRIVER

CROSS-REFERENCE TO RELATED APPLICATIONS/INCORPORATION BY REFERENCE

This patent application is a continuation of U.S. application Ser. No. 17/215,330, filed Mar. 29, 2021, which is a continuation of U.S. application Ser. No. 16/787,085, filed Feb. 11, 2020, which is a continuation of U.S. application Ser. No. 16/546,899, filed Aug. 21, 2019, which is a continuation of U.S. application Ser. No. 15/627,803, filed Jun. 20, 2017, (U.S. Pat. No. 10,455,317), which is a continuation of U.S. application Ser. No. 14/722,797, filed May 27, 2015, now U.S. Pat. No. 9,686,604, which is related to and claims priority from U.S. provisional patent application Ser. No. 62/003,306, filed May 27, 2014, the contents of each of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Conventional headphone drivers and/or methods of operating headphone drivers suffer from non-linear distortion and diaphragm break-up, among other things. Further limitations and disadvantages of conventional and traditional approaches will become apparent to one of skill in the art, through comparison of such systems with some aspects of the present invention as set forth in the remainder of the present application with reference to the drawings.

SUMMARY

Figure 1:
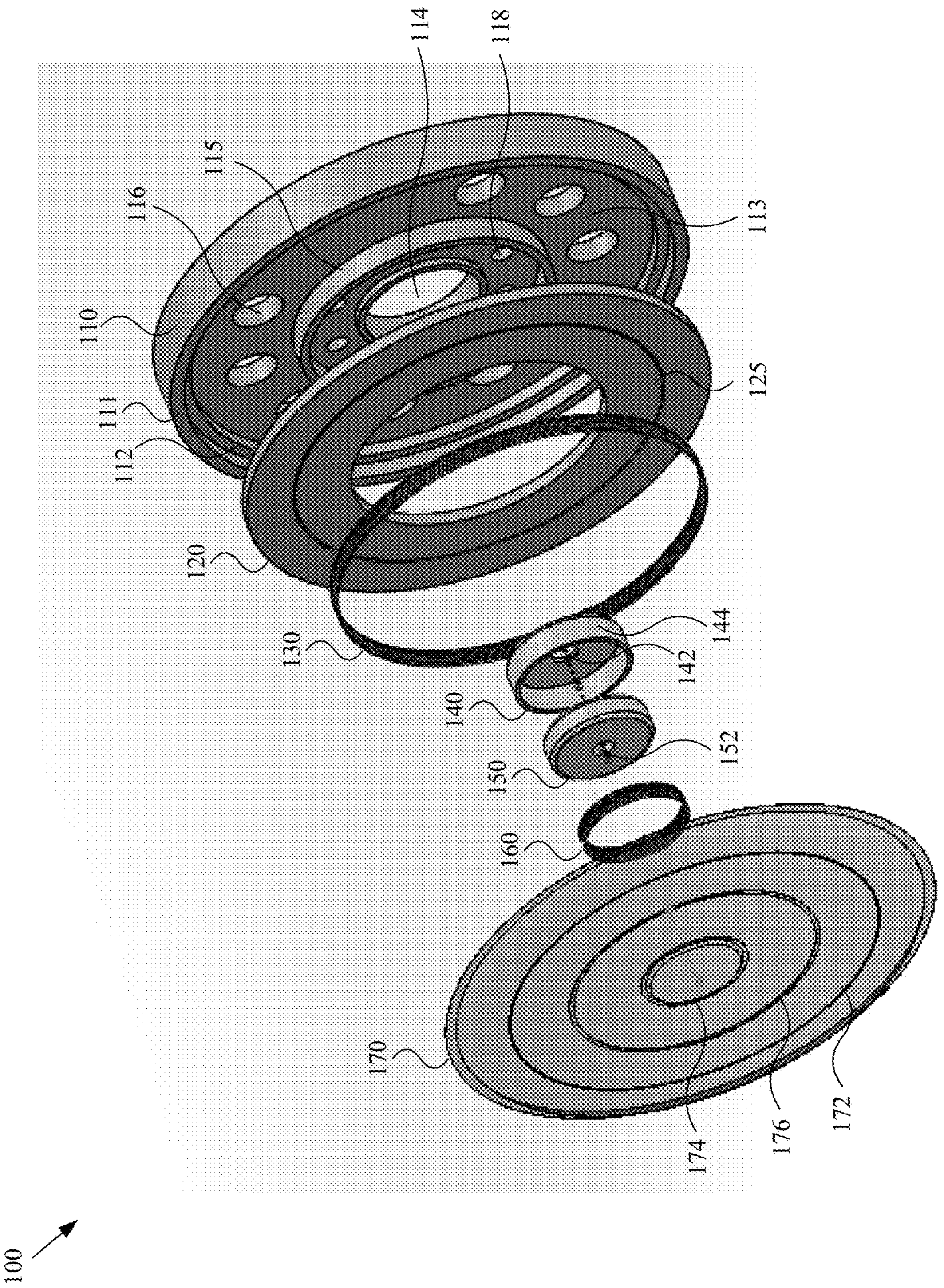
FIG. 1 is a diagram illustrating components of a headphone speaker, in accordance with various aspects of the disclosure.

Systems and methods are provided for a hybrid ring-radiator headphone driver, substantially as shown in and/or described in connection with at least one of the figures, as set forth more completely in the claims.

Advantages, aspects and novel features of the present invention, as well as details of an illustrated embodiment thereof, will be more fully understood from the following description and drawings

DETAILED DESCRIPTION OF VARIOUS ASPECTS OF THE DISCLOSURE

The following discussion will present various aspects of the present disclosure by providing various examples. Such examples are non-limiting, and thus the scope of various aspects of the present disclosure should not necessarily be limited by any particular characteristics of the provided examples.

As utilized herein the terms “circuits” and “circuitry” refer to physical electronic components (i.e., hardware) and any software and/or firmware (“code”) which may configure the hardware, be executed by the hardware, and or otherwise be associated with the hardware. As used herein, for example, a particular processor and memory may comprise a first “circuit” when executing a first one or more lines of code and may comprise a second “circuit” when executing a second one or more lines of code.

As utilized herein, the phrases “for example,” “exemplary,” and “e.g.” are non-limiting and are generally synonymous with “by way of example and not limitation,” “for example and not limitation,” and the like.

As utilized herein, “and/or” means any one or more of the items in the list joined by “and/or”. As an example, “x and/or y” means any element of the three-element set {(x), (y), (x, y)}. As another example, “x, y, and/or z” means any element of the seven-element set {(x), (y), (z), (x, y), (x, z), (y, z), (x, y, z)}.

The following discussion may at times utilize the phrase “operable to,” “operates to,” and the like in discussing functionality performed by particular hardware, including hardware operating in accordance with software instructions. The phrase “operates to,” “is operable to,” and the like include “operates when enabled to”. For example, a module that operates to perform a particular operation, but only after receiving a signal to enable such operation, is included by the phrases “operates to,” “is operable to,” and the like.

In general, a speaker creates air pressure or a Sound Pressure Level (SPL) that is interpreted by the ear as sound. For example, the more air pressure that is created between a speaker (or audio driver) and the ear, the louder a sound will be seem to a listener. The pressure created inside the acoustic volumes of a headphone is, for example, due to the volume of air that the driver is attempting to displace.

The volume of air that is displace by a driver is generally proportional to both the radiating surface area of a diaphragm (or radiating surface area) and the distance that the diaphragm moves (or diaphragm excursion). Thus, one of the ways to increase the volume of air that is displaced is by increasing the radiating area, and another of the ways to increase the volume of air that is displaced is by increasing the diaphragm excursion.

Regarding the radiating area for a particular diaphragm, for example a circular diaphragm, the radiating area is not calculated based on the entire radius of the diaphragm because of various inefficiencies. In one example, the radiating area may be calculated based on the radius from the center of the diaphragm to ½ of the distance between the voice coil that is coupled to the diaphragm and where the outer perimeter of the diaphragm is attached to the frame. In other words, the entire area of a diaphragm is not efficiently utilized in a conventional driver. Additionally, simply increasing the radiating area by increasing the diameter of the diaphragm introduces various issues, for example response issues and cost issues, and in various implementations might not even be possible.

Regarding the diaphragm excursion, the driver motor (e.g., a linear motor used to move the diaphragm) is generally constructed with a voice coil attached to the diaphragm, and with a magnet, in relation to which the voice coil and diaphragm move. As current flows through the voice coil and creates a magnetic field, the voice coil and the magnet are attracted to each other or are opposed to each other, thereby causing the diaphragm to move and displace air. The voice coil generally moves through a gap in or around the magnet. As the relative position between the voice coil and the magnet changes, non-linearities are introduced in the movement (or excursion) of the diaphragm. Such non-linearities result in distortion. Thus, simply increasing the excursion of the diaphragm will generally result in additional distortion.

Another issue with conventional speaker design is often referred to as cone or diaphragm break up. For example, as explained above, the voice coil of a driver is typically located near the center of the driver and connects to the diaphragm. As the voice coil moves in and out, so does that diaphragm to which the voice coil is attached. However, as the frequency increases, there are resonances where the voice coil is moving out with the diaphragm but the outside of the diaphragm is delayed and still moving in. This creates a situation where the diaphragm is producing both in phase and out of phase displacement at the same time, which in turn results in peaks and dips in the frequency response. The utilization of relatively stiffer materials may still produce break-up modes and could also produce a harsh sound due to, for example, limited damping. A relatively softer material with more damping but with a higher geometric stiffness may be beneficial.

Various aspects of the present disclosure may, for example, effectively increase the radiating area of a driver. Such an increase in the radiating area may, for example, beneficially increase sound levels while maintaining a distortion level of a driver. Such an increase in the radiating area may also, for example, beneficially maintain a sound level while decreasing non-linear distortion of a driver (e.g., by reducing driver excursion). These and other beneficial aspects of the present disclosure will become apparent to the reader of this disclosure.

Various aspects of the present disclosure may, for example, comprise a center driver (or speaker) architecture in which a conventional driver, for example a cone driver, is positioned in the center of a ring radiator outer driver. In an example implementation, the radiating area of the center driver may effectively be added to the radiating area of the outer ring radiator, resulting in a larger effective radiator area, for example relative to merely using a larger center driver. Additionally, such an architecture may provide for reduced diaphragm size and/or increased stiffness (e.g., due to a multi-diaphragm design or a single-diaphragm design in which the center ring is secured), which may in turn reduce break-up modes. From another perspective, the use of multiple voice coils (e.g., on a single diaphragm and/or multiple concentric diaphragms) will reduce break-up modes. For example, multiple voice coils may be utilized to ensure that different radially-diverse rings of a same diaphragm (or multiple concentric diaphragms) move in phase with each other.

This disclosure includes a set of figures which are presented to illustrate various aspects of this disclosure. Such aspects includes various mechanical aspects, for example generally illustrated in FIGS. 1-5, and various electrical aspects, for example generally illustrated in FIGS. 6-8. The mechanical aspects will generally be discussed first, followed by the electrical aspects.

Figure 2:
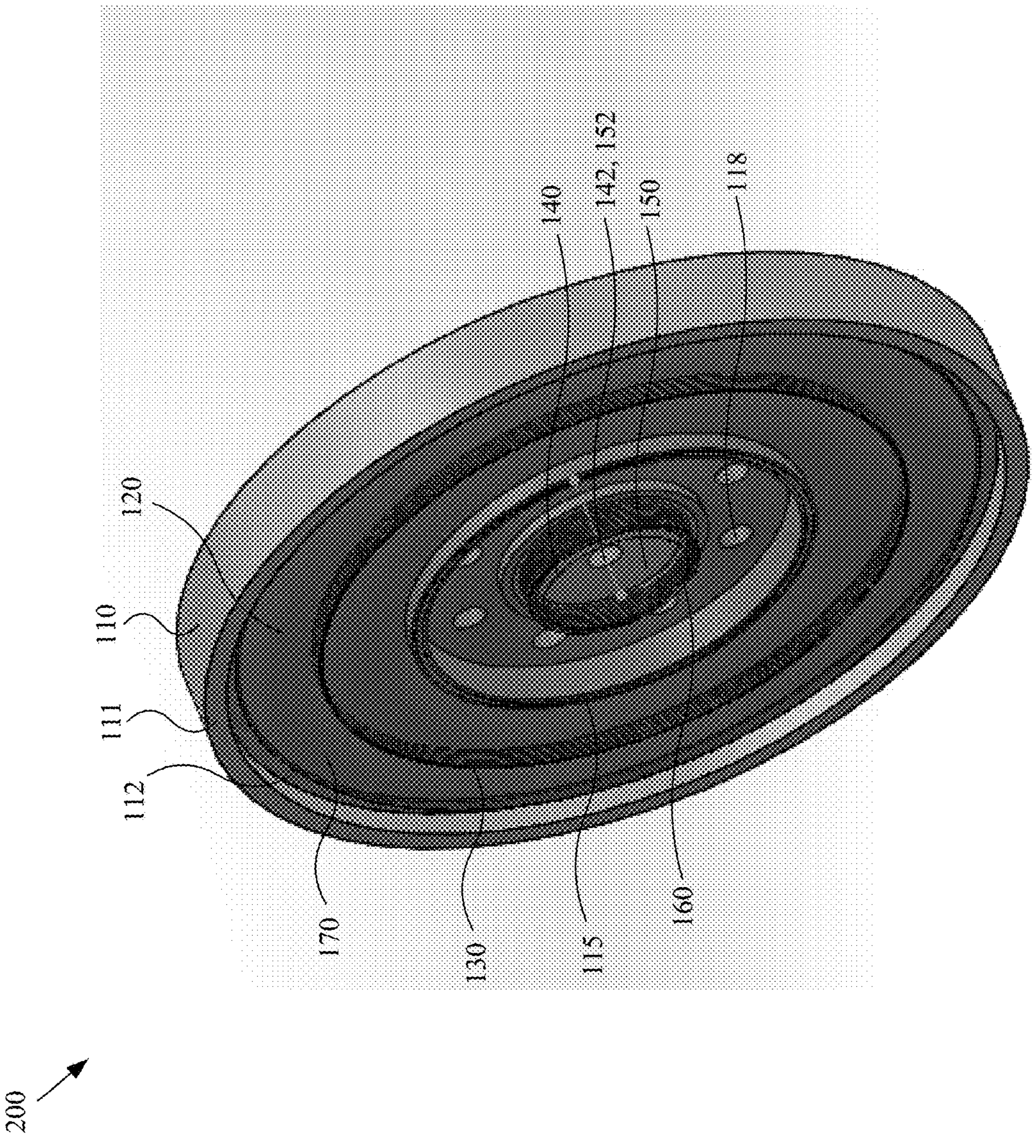
FIG. 2 is a diagram illustrating a headphone speaker, in accordance with various aspects of the disclosure.
Figure 3:
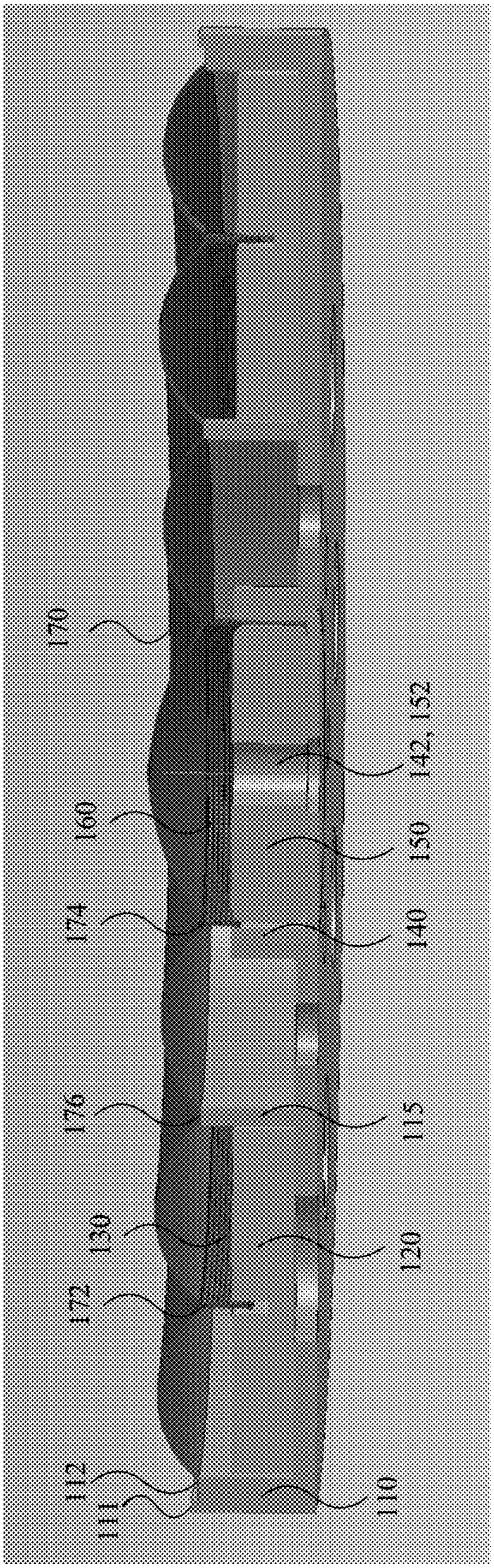
FIG. 3 is a diagram illustrating a side cross-sectional view of a headphone speaker, in accordance with various aspects of the disclosure.
Figure 4:
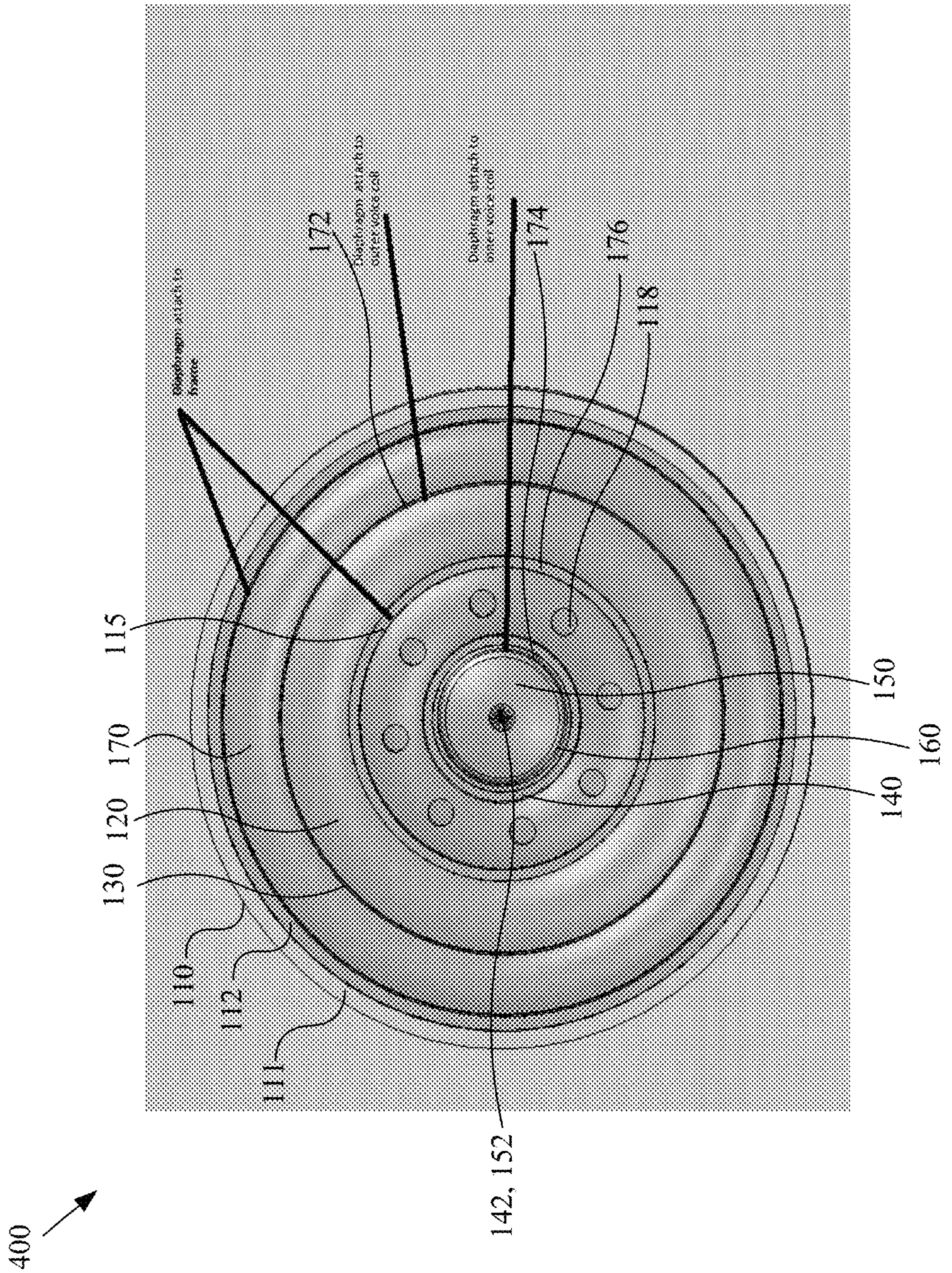
FIG. 4 is a diagram illustrating a top view of a headphone speaker, in accordance with various aspects of the disclosure.
Figure 5:
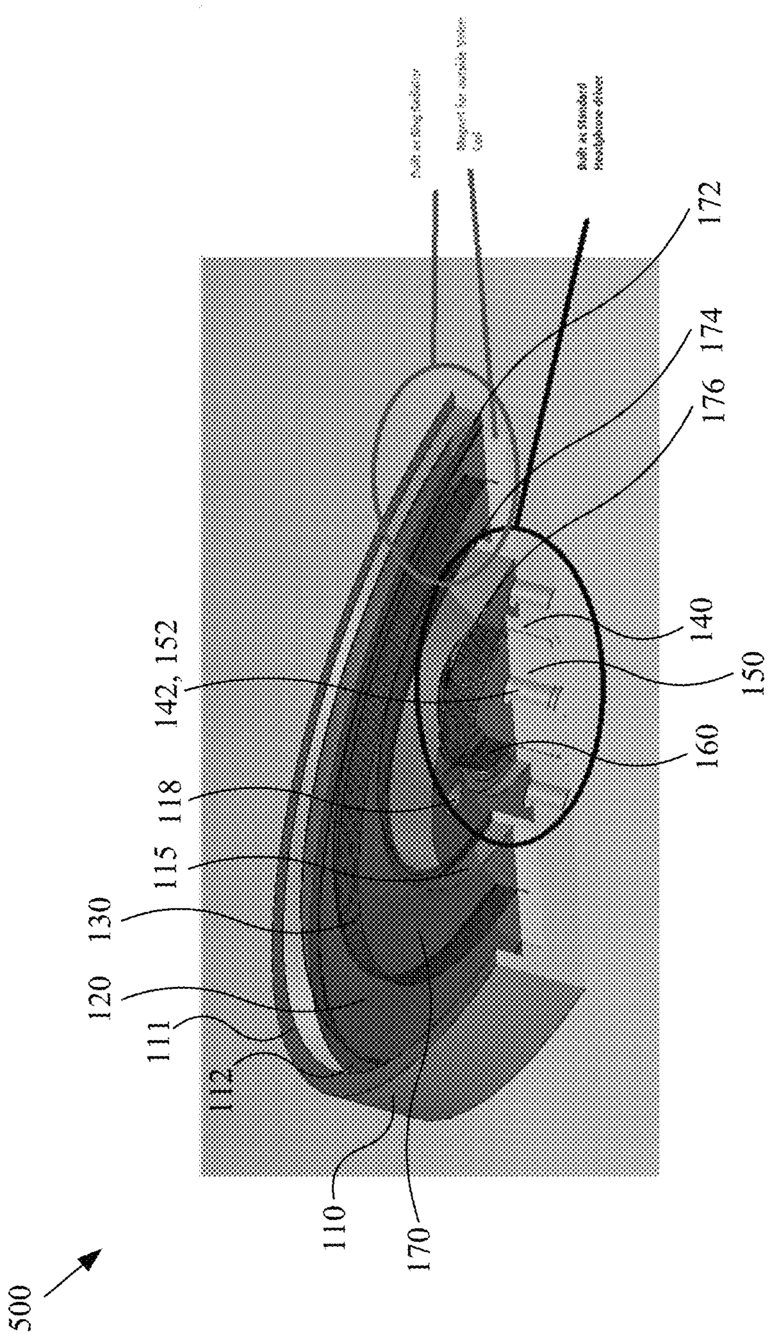
FIG. 5 is a diagram illustrating a perspective cross-sectional view of a headphone speaker, in accordance with various aspects of the disclosure.

Turning first to FIGS. 1-5, such figures present examples of various aspects of the disclosure. In particular, FIG. 1 is a diagram 100 illustrating components of a headphone speaker, in accordance with various aspects of the disclosure. Also, FIG. 2 is a diagram 200 illustrating a headphone speaker, in accordance with various aspects of the disclosure. Further, FIG. 3 is a diagram 300 illustrating a side cross-sectional view of a headphone speaker, in accordance with various aspects of the disclosure. Additionally, FIG. 4 is a diagram 400 illustrating a top view of a headphone speaker, in accordance with various aspects of the disclosure. Still further, FIG. 5 is a diagram 500 illustrating a perspective cross-sectional view of a headphone speaker, in accordance with various aspects of the disclosure.

In FIGS. 1-5, like numbers generally refer to like elements, shown in different contexts and views, and will thus generally be discussed together. Occasionally, the following discussion will point to a particular figure for a particular aspect.

The speaker may comprise a frame 110. The frame 110 may, for example, be formed of any of a variety of materials (e.g., metal, plastic, composite, etc.). The frame 110 is illustrated with an outer portion for a ring radiator and an inner portion for a center driver (e.g., a convention driver, for example a cone driver). For example, the frame 110 may comprise an outer ring 111. Also for example, the frame 110 may comprise an outer shelf 112. As discussed herein, a diaphragm for the ring radiator may be attached to the outer shelf 112.

The frame 110 also comprises a middle ring 115, which may, for example, serve as a boundary between an outer chamber for the ring radiator and an inner chamber for the center driver. As will be discussed elsewhere herein, one or more diaphragms may be attached to the middle ring 115. The middle ring 115 may, for example, have a substantially similar or same height as the outer shelf 112. The middle ring 115 and the outer shelf 112 may, for example define an outer slot 113 into which an outer magnet is positioned. The middle ring 115 is generally illustrated at the radial midpoint of the frame, but need not be. For example, the middle ring 115 may be positioned closer to the outer ring 111 then to the center of the frame 110 or may be positioned closer to the center of the frame 110 than to the outer ring 111. In other words, the location of the middle ring 115 may be positioned to set characteristics of the speaker to match those characteristics needed for a particular implementation. In an example implementation, the middle ring 115 may be positioned to match the respective radiating areas of the ring radiator and the center driver.

The frame 110 additionally comprises a center opening 114, for example for insertion of a center magnet structure. The frame 110 further comprises a plurality of outer vent holes 116 for venting the ring radiator chamber, and a plurality of inner vent holes 118 for venting the center driver.

Though the speaker illustrated in FIGS. 1-5 is shown with a center driver surrounded by a single ring radiator, the various aspects of this disclosure also apply to any number of drivers (e.g., concentric drivers). For example, a third driver (e.g., a second outer ring radiator surrounding the first) may be implemented, a fourth driver, etc.

The speaker may also comprise an outer magnet 120. The outer magnet 120 may, for example, be ring-shaped and sized to fit within the outer slot 113. The outer magnet 120 may comprise an outer slot (or groove) 125. As discussed herein, an outer voice coil may be movably positioned in the slot 125. The outer magnet 120 may, for example, comprise a permanent or semi-permanent magnet that comprises any of a number of magnet materials. The dimensions of the outer magnet 120 may vary depending on the implementation.

The outer magnet 120 may be generally positioned over the outer vent holes 116 or portions thereof. In such a configuration, the outer magnet 120 may comprise its own vent holes 116 to keep from blocking the outer vent holes 116. Also for example, the frame 110 (e.g., the outer shelf 112 and/or outer ring 111) may comprise venting features to keep the outer magnet 120 from significantly impairing the air flow provided by the outer vent holes 116. Additionally, for example, outer magnet 120 may be sized and/or positioned in a manner that does not cover the outer vent holes 116 (e.g., in-whole or in-part). Though not shown, some or all of the outer vent holes 116, as well as the inner vent holes 118 and/or any vent holes discussed herein, may be covered with an acoustic scrim (or non-woven paper), which may for example partially block the vents to tune the vents for an appropriate back pressure.

The speaker may further comprise an outer voice coil 130. The outer voice coil 130 may, for example, be attached to a diaphragm (e.g., a single diaphragm used for both the ring radiator and the center driver or a diaphragm dedicated to the ring radiator). The outer voice coil 130 may, for example, be movably positioned in the outer slot 125 of the outer magnet 120. During operation of the ring radiator of the speaker, the outer voice coil 130 moves axially in the outer slot 125 of the outer magnet 120 in an axially in-and-out motion to move the diaphragm (or portion thereof) to which the outer voice coil 130 is attached. In various implementations, during operation the outer voice coil 130 (or portion thereof) may always reside in the outer slot 125.

In operation, as explained above, as the outer voice coil 130 receives an electrical driving signal from the driver electronics, current will flow through the outer voice coil 130 and create a magnetic field. This magnetic field, in turn, causes motion between the outer voice coil 130 and the outer magnet 120. Since the outer voice coil 130 is attached to a diaphragm (or portion thereof), this motion of the outer voice coil 130 causes the diaphragm to move, which in turn displaces air and creates the pressure waves that are interpreted as sound.

The ring radiator may, for example, be designed to have a respective set of Theile/Small parameters. For example, the BL-product (e.g., characterizing the interaction between the outer voice coil 130 and outer magnet 120) might have a value of N. As discussed herein, the respective Theile/Small parameters for the ring radiator and the center driver may be the same or similar, but may also be substantially different depending on the design goals for the particular speaker system. In an example scenario in which the Theile/Small parameters for the ring radiator and the center driver may be the same or similar, the number of turns on the outer voice coil 130 may be less than the number of turns on the center voice coil 160.

As mentioned above, the outer voice coil 130 is generally located in the outer slot 125 or the outer magnet 120, and the outer slot 125 is generally shown to be located in the radial center of the outer magnet 120. The location of the outer slot 125 in the outer magnet 120 need not, however, be in the radial center. For example, the location of the outer slot 125 may be closer to the outer edge of the outer magnet 120 than to the inner edge of the outer magnet 120. For example, the location of the outer slot 120 may be positioned at a location that optimizes the radiating area of the outer diaphragm (or outer diaphragm portion of a shared diaphragm) to which the outer voice coil 130 is attached. In an example configuration, the outer slot 120 may be positioned to equalize the areas of the ring radiator diaphragm (or ring radiator portion of a single diaphragm) that are positioned outside of the outer voice coil 130 and positioned inside of the outer voice coil 130.

The speaker may comprise a center magnet cup 140 that fits in the center opening 114 of the frame 110. The center magnet cup 140 may, for example, be press fit into the center opening 114 and/or held in place with a mechanical and/or adhesive coupling. The center magnet cup 140 may comprise a center cup hole 142, which may, for example, be used for attaching and/or aligning a center magnet with the center magnet cup 140. The center magnet cup 140 may comprise a center cup lip 144.

The speaker may comprise a center magnet 150. The center magnet 150 may, for example, be cylinder-shaped and sized to fit within the center magnet cup 140. For example, the center magnet 150 may be sized to fit within the center magnet cup 140 and provide a center magnet slot (or groove) in which an inner voice coil may be movably positioned. The center magnet 150 may, for example, comprise a permanent or semi-permanent magnet that comprises any of a number of magnet materials. The dimensions of the center magnet 150 may vary depending on the implementation.

Though, in the example configuration illustrated the center magnet 150 is not positioned over vent holes in the frame 110, the center magnet 150, as with the outer magnet 120, may comprise its own vent holes.

As with the center magnet cup 140, the center magnet 150 may comprise a center magnet hole 152. The center magnet hole 152 (or a plurality thereof) may, for example, serve as a vent hole to vent the driver section inside of the inner voice coil 160. The center magnet hole 152 may also, for example depending on the particular implementation, be utilized in conjunction with the center cup hole 142 to radially and/or axially align the center magnet 150 and the center magnet cup 140. Such alignment may, for example, comprise maintaining the center magnet slot in which an inner voice coil may be movably positioned. Note that, as with the outer magnet 120, the center magnet 150 may comprise the center magnet slot within the center magnet 150 (e.g., instead of having the center magnet slot between the center magnet 150 and the center magnet cup 140).

The speaker may further comprise an inner voice coil 160. The inner voice coil 160 may, for example, be attached to a diaphragm (e.g., a single diaphragm used for both the center driver and the ring radiator or a diaphragm dedicated to the center driver). The inner voice coil 160 may, for example, be movably positioned in the center magnet slot that is radially between the center magnet 150 and the center magnet cup 140. During operation of the center driver of the speaker, the center voice coil 160 moves axially in the center magnet slot in an axially in-and-out motion to move the diaphragm (or portion thereof) to which the inner voice coil 160 is attached. In various implementations, during operation the inner voice coil 160 (or portion thereof) may always reside in the center magnet slot.

In operation, as explained above, as the inner voice coil 160 receives an electrical driving signal from the driver electronics, current will flow through the inner voice coil 160 and create a magnetic field. This magnetic field, in turn, causes motion between the inner voice coil 160 and the center magnet 150. Since the inner voice coil 160 is attached to a diaphragm (or portion thereof), this motion of the inner voice coil 160 causes the diaphragm to move, which in turn displaces air and creates the pressure waves that are interpreted as sound.

The center driver (e.g., a conventional driver, for example a cone driver) may, for example, be designed to have a respective set of Theile/Small parameters. For example, the BL-product (e.g., characterizing the interaction between the inner voice coil 160 and center magnet 150) might have a value of M. As discussed herein, the respective Theile/Small parameters for the center driver and the ring radiator may be the same or similar, but may also be substantially different depending on the design goals for the particular speaker system.

In an example scenario in which the Theile/Small parameters for the center driver and the ring radiator may be the same or similar, the number of turns on the center voice coil 160 may be greater than the number of turns on the outer voice coil 130. In another example, the Theile/Small parameters for the center driver and the ring radiator may be substantially different. For example, in an example surround sound scenario, center sound may be directed mostly or completely to the center driver. In such a scenario, it might be advantageous for the inner driver to have more energy or radiating capability.

As mentioned above, the inner voice coil 160 is generally located in the center magnet slot between the center magnet 150 and the center magnet cup 140. The location of the center magnet slot need not, however, be in the illustrated location. For example, in an example scenario, the location of the center magnet slot may positioned at a radial midpoint in the radius of the center magnet 150, be closer to the outer edge of the center magnet 150 than to the center of the center magnet 150. For example, the location of the center magnet slot may be positioned at a location that optimizes the radiating area of the inner diaphragm (or inner diaphragm portion of a shared diaphragm) to which the inner voice coil 160 is attached. In an example configuration, the center magnet slot may be positioned to equalize the areas of the center driver diaphragm (or center driver portion of a single diaphragm) that are positioned outside of the inner voice coil 160 and positioned inside of the inner voice coil 160.

The speaker may additionally comprise a diaphragm 170. Though the example illustration uses a diaphragm 170 that is shared between the ring radiator (or outer) portion of the speaker and the center driver (or inner) portion of the speaker, the scope of this disclosure should not be limited to such an implementation. For example, the diaphragm 170 may be implemented in separate parts, for example completely and/or mostly separated from each other, an inner part used for the center driver and an outer part used for the ring radiator.

As mentioned previously, the diaphragm 170 may be attached to the outer voice coil 130 and to the inner voice coil 160. In particular, in the illustrated example, the diaphragm 170 may be attached to the outer voice coil at diaphragm outer ring 172, and the diaphragm 170 may be attached to the inner voice coil 160 at diaphragm inner ring 174. The diaphragm 170 may also be attached to the middle ring 115 of the frame 170 at diaphragm middle ring 176, where such attachment essentially splits the diaphragm 170 into an outer portion used for the ring radiator and an inner portion used for the center driver. The diaphragm 170 may also be attached to the outer shelf 112 of the frame 110 at the outer perimeter of the diaphragm 170.

The movement of the outer voice coil 130 relative to the outer magnet 120 moves the diaphragm outer ring 172 and thus the outer portion of the diaphragm 170 that is radially outside of the diaphragm middle ring 176, and the movement of the inner voice coil 160 relative to the center magnet 150 moves the diaphragm inner ring 174 and thus inner portion of the diaphragm 170 that is radially inside of the diaphragm middle ring 176.

In an implementation in which a single diaphragm 170 is shared between the center driver and the ring radiator, the diaphragm may have different physical characteristics at inner and outer portions associated with the different respective drivers. For example, the diaphragm 170 may have different respective thicknesses for the inner and outer portions. Also for example, the diaphragm 170 may have different respective sets of material layers and/or coatings for the inner and outer portions.

In an implementation of the diaphragm 170 with a separate outer diaphragm and a separate inner diaphragm, the inner diaphragm may for example be generally circular and attached to the middle ring 115 of the frame 110 at the outer perimeter of the inner diaphragm. The inner diaphragm may, for example, comprise a conventional driver diaphragm.

Also in an implementation of the diaphragm 170 with a separate outer diaphragm and a separate inner diaphragm, the outer diaphragm may for example be generally ring-shaped with an inner perimeter and an outer perimeter. The inner perimeter of the outer diaphragm may, for example, be attached to the middle ring 115 of the frame 110, and the outer perimeter of the outer diaphragm may, for example, be attached to the outer shelf 112 of the frame. Such diaphragm attachments discussed herein may be effected using epoxy. The outer diaphragm may, for example, comprise a ring radiator diaphragm.

Note that in a dual-diaphragm implementation, the middle ring 115 of the frame 110 may comprise a wide enough surface for separate attachment of both the inner and outer diaphragms. Also for example, the middle ring 115 may comprise an inner shelf to which the inner diaphragm is attached and an outer shelf to which the outer diaphragm is attached. Additionally, the middle ring 115 of the frame 110 may comprise two separate rings, one for attachment of the inner diaphragm and one for attachment of the outer diaphragm.

In an implementation of the diaphragm 170 with a separate outer diaphragm and a separate inner diaphragm, the inner and outer diaphragms may have different respective thicknesses and/or be made from different respective materials and/or have different respective coatings. For example, in an example scenario, an inner diaphragm may comprise Mylar (or PET) or Polyethylene for the center driver, and an outer diaphragm may comprise Polyetherimide (PEI) for the ring radiator.

As mentioned previously, the scope of various aspects of this disclosure should not be limited by characteristics of an implementation with a center driver and a single ring radiator. Alternative implementations may, for example, comprise a plurality of ring radiators (or other drivers), for example an inner ring radiator (or other driver) disposed around a center driver and an outer ring radiator (or other driver) disposed around the inner ring radiator.

Figure 6:
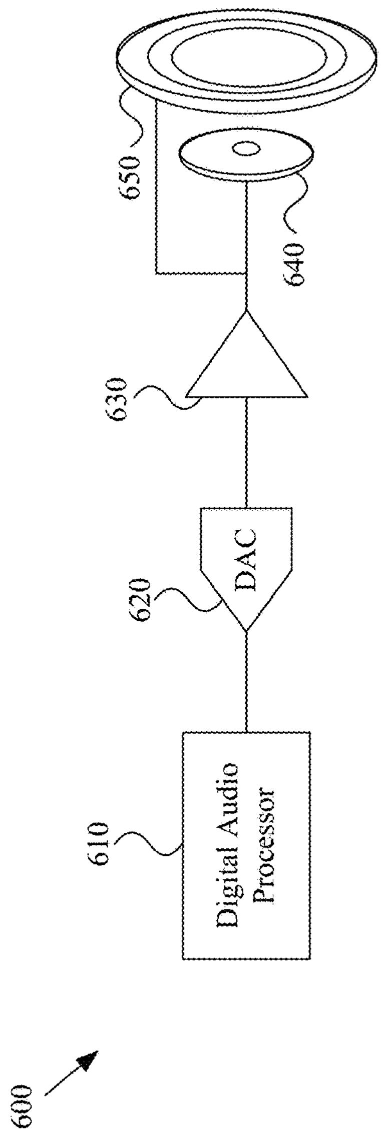
FIG. 6 is a schematic diagram of a speaker driver circuit, in accordance with various aspects of the disclosure.

The previous discussion of FIGS. 1-5 focused primarily on mechanical aspects. The following discussion of FIGS. 6-8 will focus primarily on electrical aspects. As discussed herein, a same audio signal may be provided to each of the center driver and the ring radiator (e.g., the voice coils thereof). FIG. 6 is a schematic diagram of a speaker driver circuit 600, in accordance with various aspects of the disclosure, that may provide such a same signal to both the center driver and the ring radiator. In an example scenario, the center driver and the ring radiator may have been mechanically designed to receive the same signal (e.g., with same or similar Theile/Small parameters, for example BL-product).

The circuit 600 comprises a digital audio processor 610. The digital audio processor 610 may comprise characteristics of any of a variety of digital audio processors 610. For example, the digital audio processor 610 may comprise a processor executing software (or firmware) instructions stored in a memory. Also for example, the digital audio processor 610 may comprise an application-specific integrated circuit (ASIC). In general, the digital audio processor 610 forms the signal(s) that are converted the analog domain, amplified, and provided to speaker circuitry.

The digital audio processor 610 outputs a digital audio signal to a digital-to-analog converter (DAC) 620. The DAC 620 converts the digital audio signal to an analog audio signal and provides the analog audio signal to the amplifier 630. The amplifier 630 then provides the amplified analog audio signal to the center driver 640 and to the ring radiator 650.

Figure 7:
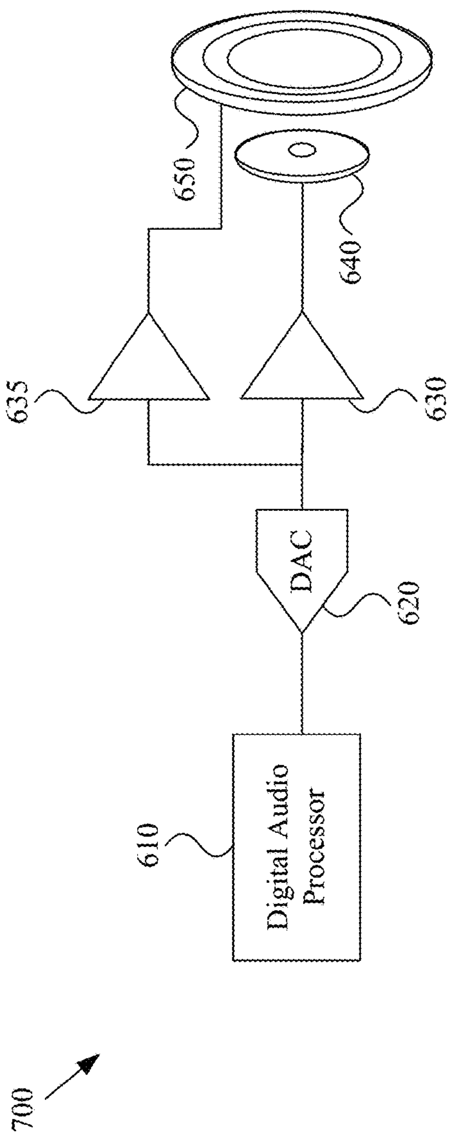
FIG. 7 is a schematic diagram of a speaker driver circuit, in accordance with various aspects of the disclosure.

In another example, a same audio signal may be provided to each of the center driver and the ring radiator (e.g., the voice coils thereof) as respective isolated signals. FIG. 7 is a schematic diagram of a speaker driver circuit 700, in accordance with various aspects of the disclosure, that may provide such a same isolated signal to both the center driver and the ring radiator. In an example scenario, the center driver and the ring radiator may have been mechanically designed to receive the same signal (e.g., with same or similar (e.g., within 5%) Theile/Small parameters, for example BL-product).

The circuit 700 comprises a digital audio processor 610. The digital audio processor 610 may comprise characteristics of any of a variety of digital audio processors 610. For example, the digital audio processor 610 may comprise a processor executing software (or firmware) instructions stored in a memory. Also for example, the digital audio processor 610 may comprise an application-specific integrated circuit (ASIC). In general, the digital audio processor 610 forms the signal(s) that are converted the analog domain, amplified, and provided to speaker circuitry.

The digital audio processor 610 outputs a digital audio signal to a digital-to-analog converter (DAC) 620. The DAC 620 converts the digital audio signal to an analog audio signal and provides the analog audio signal to two independent amplifiers, namely a first amplifier 630 dedicated to the center driver 640 and a second amplifier 635 dedicated to the ring radiator 650. 630. The first amplifier 630 then provides a first amplified analog audio signal to the center driver 640, and the second amplifier 635 provides a second amplified analog audio signal to the ring radiator 650.

The first amplifier 630 and second amplifier 640 may have the same or different respective gains. For example, a stronger amplified same audio signal may be provided to one of the center driver 640 and ring radiator 650, and a weaker amplifier same audio signal may be provided to the other of the center driver 640 and radiator 650. Though not shown in the schematic, respective analog domain frequency filters may also be utilized in the respective signal paths.

Figure 8:
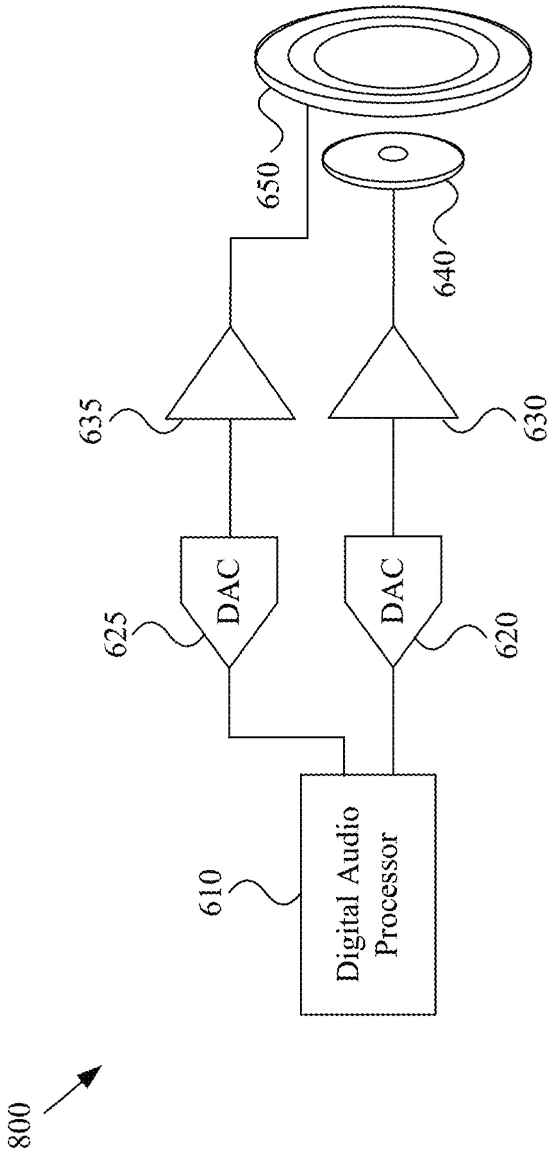
FIG. 8 is a schematic diagram of a speaker driver circuit, in accordance with various aspects of the disclosure.

In another example implementation, different audio signals (e.g., from a spectral content and/or a time delay perspective) may be provided to the center driver and ring radiator. As an example, FIG. 8 is a schematic diagram of a speaker driver circuit 800, in accordance with various aspects of the disclosure, that may provide different signal to the center driver and the ring radiator. In an example scenario, the center driver and the ring radiator may have been mechanically designed to receive the same signal (e.g., with same or similar Theile/Small parameters, for example BL-product) or different signals (e.g., with significantly different Theile/Small parameters, for example BL-product).

The circuit 800 comprises a digital audio processor 610. The digital audio processor 610 may comprise characteristics of any of a variety of digital audio processors 610. For example, the digital audio processor 610 may comprise a processor executing software (or firmware) instructions stored in a memory. Also for example, the digital audio processor 610 may comprise an application-specific integrated circuit (ASIC). In general, the digital audio processor 610 forms the signals that are converted the analog domain, amplified, and provided to speaker circuitry.

The digital audio processor 610 outputs a first digital audio signal to a first digital-to-analog converter (DAC) 620. The first DAC 620 converts the first digital audio signal to a first analog audio signal and provides the first analog audio signal to a first amplifier 630, for example dedicated to the center driver 640. The first amplifier 630 then provides a first amplified analog audio signal to the center driver 640.

The digital audio processor 610 outputs a second digital audio signal to a second digital-to-analog converter (DAC) 625. The second DAC 625 converts the second digital audio signal to a second analog audio signal and provides the second analog audio signal to a second amplifier 635, for example dedicated to the ring radiator 650. The second amplifier 635 then provides a second amplified analog audio signal to the ring radiator 650.

As with the circuits 600, 700 discussed previously, the digital audio processor 610 may output a same signal to each respective signal path for the center driver 640 and ring radiator 650. The digital audio processor 610 may also (e.g., always or just at times) output different signals to each of the respective signal paths.

As mentioned previously, the ring-radiator and center driver may have the same or different responses. Accordingly, the respective audio signals provided to each may be tailored in anticipation of the respective responses (e.g., in a feed-forward and/or adaptive feed-forward manner). Additionally for example, in a scenario in which one of the drivers needs more time to react to a particular signal (or spectral portion thereof), the signal (or portion thereof) may be provided to the driver's respective signal path temporally ahead of the signal (or portion thereof) being provided to the other driver's respective signal path, for example to temporally synchronize the generation of sound by the respective drivers. Such a temporal shift may also be utilized to create a three-dimensional effect.

Also for example, different respective audio frequency content may be provided to the respective audio paths. For example, in an example scenario in which it is desired to direct more base content to the center driver than to the ring radiator, the respective audio signal generated for the center driver signal path may comprise relatively more base content than the respective audio signal generated for the ring radiator signal path. Also for example, respective ranges of spectral content may be provided to the respective driver that is the most efficient at presenting the respective ranges.

Also, different respective audio signals may be generated for the center driver and ring radiator to achieve various sound effects. For example, in a surround sound scenario, sound corresponding to a center speaker may be provided to the center driver, while sound corresponding to the side and/or rear channels may be provided to the ring radiator. Also for example, a particular sound source (e.g., a voice of a primary vocalist in music or speech, or an instrument presently playing lead) may be directed to a selected respective path (e.g., a center driver path).

The first amplifier 630 and second amplifier 640 may have the same or different respective gains. For example, a stronger amplified same audio signal may be provided to one of the center driver 640 and ring radiator 650, and a weaker amplifier same audio signal may be provided to the other of the center driver 640 and radiator 650. Though not shown in the schematic, respective analog domain frequency filters may also be utilized in the respective signal paths.

Though not shown, the circuits 600, 700, 800 (e.g., the digital audio processor 610 and/or amplifier 630, 635) may have control interfaces through which an application can direct their operation. For example, a first application (e.g., a video game) may desire a particular type of audio output performance, while a second application (e.g., high-fidelity music audio) may desire a different particular type of audio output performance. For example, a first application may desire stereo performance, while a second application desires surround-sound performance. Such a control interface may, for example, comprise gain controllers for the amplifiers 630, 635, software interface routines for directing operation of the digital audio processor 610, etc.

As discussed above, any one or more of the circuits and/or functions discussed herein may be implemented by a processor executing software instructions. Similarly, other embodiments may comprise or provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

In summary, various aspects of the present disclosure provide systems and methods for a hybrid ring-radiator headphone driver. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment(s) disclosed, but that the invention will include all embodiments falling within the scope of the appended claims.

What is claimed is:

1. A coaxial speaker comprising:

a frame comprising a first space that encircles a second space, wherein a height of the first space is less than a height of the second space;

a magnetic component;

a first voice coil disposed in the first space; and a second voice coil disposed in the second space.

2. The coaxial speaker of claim 1, wherein the coaxial speaker comprises a plurality of vent holes for venting the first space.

3. The coaxial speaker of claim 2, wherein the coaxial speaker comprises an element disposed on the frame, and wherein the element is operable to tune the plurality of vent holes.

4. The coaxial speaker of claim 1, wherein the coaxial speaker comprises a plurality of vent holes for venting the second space.

5. The coaxial speaker of claim 4, wherein the coaxial speaker comprises an element disposed on the frame, and wherein the element is operable to tune the plurality of vent holes.

6. The coaxial speaker of claim 1, wherein the coaxial speaker comprises a first diaphragm and a second diaphragm.

7. The coaxial speaker of claim 6, wherein the first diaphragm is formed in a ring shape.

8. The coaxial speaker of claim 6, wherein the second diaphragm is formed in a circular shape.

9. The coaxial speaker of claim 1, wherein the magnetic component comprise a ring magnet.

10. The coaxial speaker of claim 1, wherein the magnetic component comprise a magnet cup.

11. A speaker, comprising:

a casing comprising a dividing wall between a first sound chamber that encircles a second sound chamber, wherein a height of the second sound chamber is greater than a height of the first sound chamber;

a first diaphragm disposed in the first sound chamber; and a second diaphragm disposed in the second sound chamber.

12. The speaker of claim 11, wherein the first sound chamber surrounds the second sound chamber.

13. The speaker of claim 11, comprising a first voice coil, a second voice coil and a magnetic component, wherein the first voice coil is connected to the first diaphragm, the second voice coil is connected to the second diaphragm, the magnetic component is disposed in the casing and corresponds to the first voice coil and the second voice coil.

14. The speaker of claim 13, wherein the dividing wall is operably coupled to the magnetic component.

15. The speaker according to claim 13, wherein the magnetic component comprises a first magnetic conductive component, a second magnetic conductive component and a magnet, and wherein the first magnetic conductive component and the second magnetic conductive component are respectively connected to opposite sides of the magnet.

16. The speaker of claim 13, wherein the magnetic component comprises a ring magnet.

17. The speaker of claim 13, wherein the magnetic component comprises a magnet cup.

18. The speaker of claim 11, wherein the casing comprises a plurality of venting holes, and wherein the venting holes respectively communicate with the first sound chamber and the second sound chamber.

19. The speaker of claim 16, wherein the speaker comprises a plurality of dampers covering the venting holes.

20. The speaker of claim 11, wherein the first diaphragm and the second diaphragm do not overlap each other in an axial direction of the speaker.

* * * * *